United States Patent
Lin

(10) Patent No.: US 9,075,999 B2
(45) Date of Patent: Jul. 7, 2015

(54) MEMORY DEVICE AND METHOD FOR ADAPTIVE PROTECTION OF CONTENT

(75) Inventor: Jason T. Lin, Santa Clara, CA (US)

(73) Assignee: SanDisk Technologies Inc., Plano, TX (US)

( * ) Notice: Subject to any disclaimer, the term of this patent is extended or adjusted under 35 U.S.C. 154(b) by 594 days.

(21) Appl. No.: 12/431,353

(22) Filed: Apr. 28, 2009

(65) Prior Publication Data

US 2010/0275038 A1   Oct. 28, 2010

(51) Int. Cl.
*G06F 21/00* (2013.01)
*G06F 21/60* (2013.01)
*G06F 21/79* (2013.01)

(52) U.S. Cl.
CPC .............. *G06F 21/602* (2013.01); *G06F 21/79* (2013.01)

(58) Field of Classification Search
CPC .................................................. G06Q 2220/10
USPC ............................................... 705/50; 726/26
See application file for complete search history.

(56) References Cited

U.S. PATENT DOCUMENTS

| | | | |
|---|---|---|---|
| 7,036,020 | B2 | 4/2006 | Thibadeau |
| 7,215,771 | B1 | 5/2007 | Hamlin |
| 7,426,747 | B2 | 9/2008 | Thibadeau |
| 7,493,656 | B2 | 2/2009 | Goodwill et al. |
| 8,983,061 | B2 * | 3/2015 | Watanabe ................... 380/28 |
| 2003/0123665 | A1 | 7/2003 | Dunstan et al. |
| 2004/0133794 | A1 | 7/2004 | Kocher et al. |
| 2005/0223243 | A1 | 10/2005 | Moore et al. |
| 2006/0010500 | A1 | 1/2006 | Elazar et al. |

(Continued)

FOREIGN PATENT DOCUMENTS

| | | |
|---|---|---|
| CN | 1416237 | 5/2003 |
| EP | 1 826 698 | 8/2007 |
| WO | WO 2006/133059 | 12/2006 |
| WO | WO 2009/070430 A2 | 6/2009 |

OTHER PUBLICATIONS

International Search Report and Written Opinion for PCT Application Serial No. PCT/US2010/030398, dated Jul. 7, 2010, 13 pages.

(Continued)

*Primary Examiner* — Charles C Agwumezie
(74) *Attorney, Agent, or Firm* — Brinks Gilson & Lione

(57) ABSTRACT

A memory device and method for adaptive protection of content are disclosed. In one embodiment, a memory device is provided comprising a memory operative to store content and a controller in communication with the memory. The controller is operative to generate a content protection algorithm that is different from at least one content protection algorithm previously generated by the controller, protect the content in accordance with the content protection algorithm, generate virtual machine code containing instructions on how to unprotect the protected content, and provide the protected content and the virtual machine code to a host in communication with the memory device. In another embodiment, a method for adaptive protection of content is provided comprising generating a content protection algorithm that is different from at least one previously-generated content protection algorithm, protecting content in accordance with the content protection algorithm, generating virtual machine code containing instructions on how to unprotect the protected content, and providing the protected content and the virtual machine code to a host in communication with the memory device.

12 Claims, 5 Drawing Sheets

(56) References Cited

U.S. PATENT DOCUMENTS

| | | |
|---|---|---|
| 2006/0059094 A1* | 3/2006 | Oh et al. .................. 705/51 |
| 2006/0126836 A1* | 6/2006 | Rivas ....................... 380/47 |
| 2007/0220616 A1 | 9/2007 | Oh |
| 2007/0286420 A1 | 12/2007 | MacLean et al. |
| 2008/0082447 A1 | 4/2008 | Jogand-Coulomb et al. |
| 2008/0137848 A1* | 6/2008 | Kocher et al. ............ 380/201 |
| 2009/0172781 A1* | 7/2009 | Masuoka et al. .......... 726/3 |
| 2010/0027786 A1* | 2/2010 | Faith et al. ................ 380/44 |
| 2012/0311560 A1* | 12/2012 | Dobrovolskiy et al. .... 717/174 |

OTHER PUBLICATIONS

"Self-Protecting Digital Content," Kocher et al., Cryptography Research, Inc., 14 pages. (2003).

"Self-Protecting Digital Content," http://en.wikipedia.org/wiki/Self-Protecting_Digital_Content, 3 pages (Feb. 26, 2009).

"BD+," http://en.wikipedia.org/wiki/BD+, 6 pages (Apr. 12, 2009).

English Translation of Office Action for Chinese Patent Application Serial No. 201080028974.0 dated Dec. 26, 2013, 10 pages.

* cited by examiner

MEMORY DEVICE AND METHOD FOR ADAPTIVE PROTECTION OF CONTENT

BACKGROUND

Some content protection architectures used to protect content stored on optical discs, such as Blu-ray Discs complying with the BD+ standard, store protected content along with virtual machine code containing instructions on how to unprotect the protected content in the optical disc. During playback, a player reads the protected content and the virtual machine code from the optical disc, and a virtual machine in the player executes the virtual machine code to unprotect the protected content. Once the protected content is unprotected, the player can play the content. While this scheme offers a certain level of protection, over time, a hacker may be able to hack the content protection algorithm used to protect the content. Once the content protection algorithm is hacked, there would be no mechanism to prevent unauthorized use and copying of the content.

SUMMARY

Embodiments of the present invention are defined by the claims, and nothing in this section should be taken as a limitation on those claims.

By way of introduction, the embodiments described below generally relate to a memory device and method for adaptive protection of content. In one embodiment, a memory device is provided comprising a memory operative to store content and a controller in communication with the memory. The controller is operative to generate a content protection algorithm that is different from at least one content protection algorithm previously generated by the controller, protect the content in accordance with the content protection algorithm, generate virtual machine code containing instructions on how to unprotect the protected content, and provide the protected content and the virtual machine code to a host in communication with the memory device.

In another embodiment, a method for adaptive protection of content is provided comprising generating a content protection algorithm that is different from at least one previously-generated content protection algorithm, protecting the content in accordance with the content protection algorithm, generating virtual machine code containing instructions on how to unprotect the protected content, and providing the protected content and the virtual machine code to a host in communication with the memory device.

Other embodiments are provided, and each of the embodiments can be used alone or together in combination. Various embodiments will now be described with reference to the attached drawings.

DETAILED DESCRIPTION OF THE PRESENTLY PREFERRED EMBODIMENTS

By way of introduction, the following embodiments provide a memory device and method for adaptive protection of content that can be used to provide a more robust level of content protection than systems that use a static form of protection. Specifically, because the virtual machine code and protected content are static in some architectures, over time, a hacker may be able to hack the content protection algorithm. In addressing such issue, a memory device can adaptively protect the content with a content protection algorithm that can vary from instance to instance and can generate new virtual machine code at various times. Accordingly, even if a hacker hacks the content protection algorithm used in one instance of playback of the content, the content will still be protected because the memory device can protect the content with a different content protection algorithm at the another instance of playback of the content. This provides adaptive dynamic protection of content rather than static protection.

Figure 1:
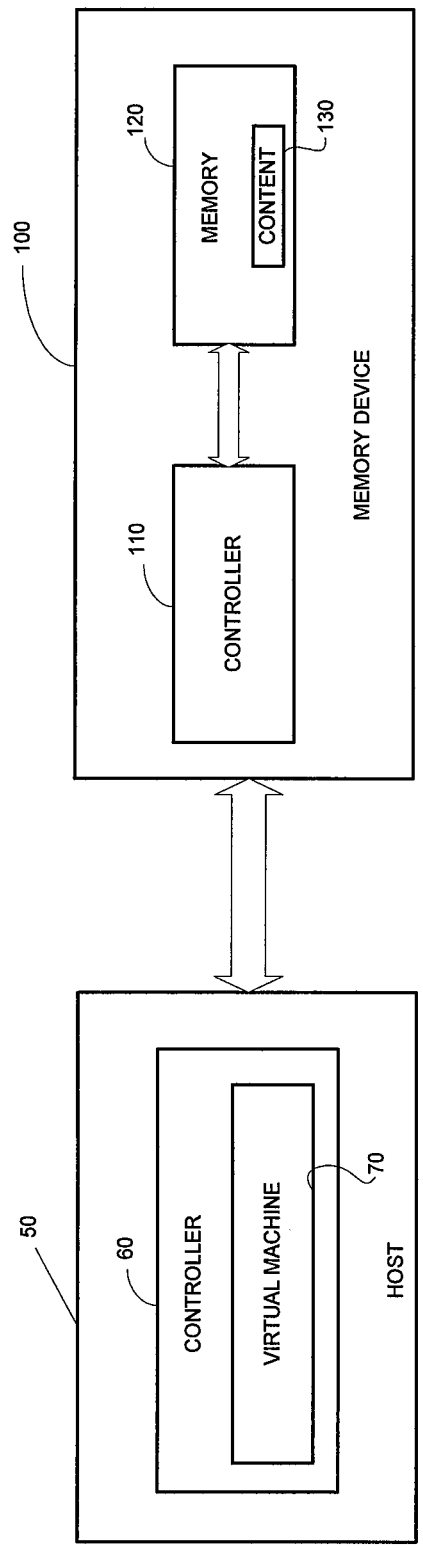
FIG. 1 is a block diagram of a host and a memory device of an embodiment.

Turning now to the drawings, FIG. 1 is a block diagram of a host 50 and a memory device 100 of an embodiment. As shown in FIG. 1, the memory device 100 comprises a controller 110 and a memory 120 operative to store content 130. "Content" can take any suitable form, such as but not limited to digital video (with or without accompanying audio) (e.g., a movie, an episode of a TV show, a news program, etc.), audio (e.g., a song, a podcast, one or a series of sounds, an audio book, etc.), still or moving images (e.g., a photograph, a computer-generated display, etc.), text (with or without graphics) (e.g., an article, a text file, etc.), a video game, and a hybrid multi-media presentation of two or more of these forms.

The controller 110 can be implemented in any suitable manner. For example, the controller 110 can take the form of a microprocessor or processor and a computer-readable medium that stores computer-readable program code (e.g., software or firmware) executable by the (micro)processor, logic gates, switches, an application specific integrated circuit (ASIC), a programmable logic controller, and an embedded microcontroller, for example. Examples of controllers include, but are not limited to, the following microcontrollers: ARC 625D, Atmel AT91SAM, Microchip PIC18F26K20, and Silicon Labs C8051F320. Examples of various components that can be used in a controller are described in the embodiments discussed below and are shown in the associated drawings. The controller 110 can also be implemented as part of the memory 120 control logic.

The memory 120 can take any suitable form. In one embodiment, the memory 120 takes the form of a solid-state (e.g., flash) memory and can be one-time programmable, few-time programmable, or many-time programmable. However, other forms of memory, such as optical memory and magnetic memory, can be used. Although shown as single components in FIG. 1, the controller 110 and/or memory 120 can be implemented with several components. Further, the memory device 100 can contain other components, which are not shown in FIG. 1 to simplify the drawings. In one embodiment, the memory device 100 takes the form of a handheld, removable memory card; however, the memory device 100 can take other forms, such as, but not limited to, a solid-state drive and a universal serial bus (USB) device.

As shown in FIG. 1, the memory device 100 is in communication with the host device 50. As used herein, the phrase "in communication with" means directly in communication with or indirectly in communication with through one or more components, which may or may not be shown or described herein. The host 50 can take any suitable form, such as, but not limited to, a dedicated content player, a mobile phone, a personal computer, a game device, a personal digital assistant (PDA), and a TV system. Preferably, the memory device 100 is removably connected to the host 50, so a user can use the memory device 100 with a variety of hosts.

As shown in FIG. 1, the controller 60 in the host 50 implements a virtual machine 70. As is well-known in the art, a virtual machine is a software component that mimics the performance of a hardware device and can run its own operating systems and applications as if it were a physical computer. In general, a virtual machine provides the benefit of compatibility, so that a party writing virtual machine code for execution on a virtual machine does not need to know the specifics of the software platform and hardware environment of the host. Also, because a virtual machine is independent from its underlying physical hardware, a virtual machine can be configured with virtual (e.g., software-created) components, such as a virtual CPU and a virtual network card, that are completely different from the physical components that are present on the underlying hardware device. In one embodiment, the host 50, controller 60, and virtual machine 70 can be the same as those used with the static protection architectures. The host 50 can contain other components (e.g., a display device, a speaker, a headphone jack, etc.), which are not shown in FIG. 1 to simplify the drawings.

Figure 2:
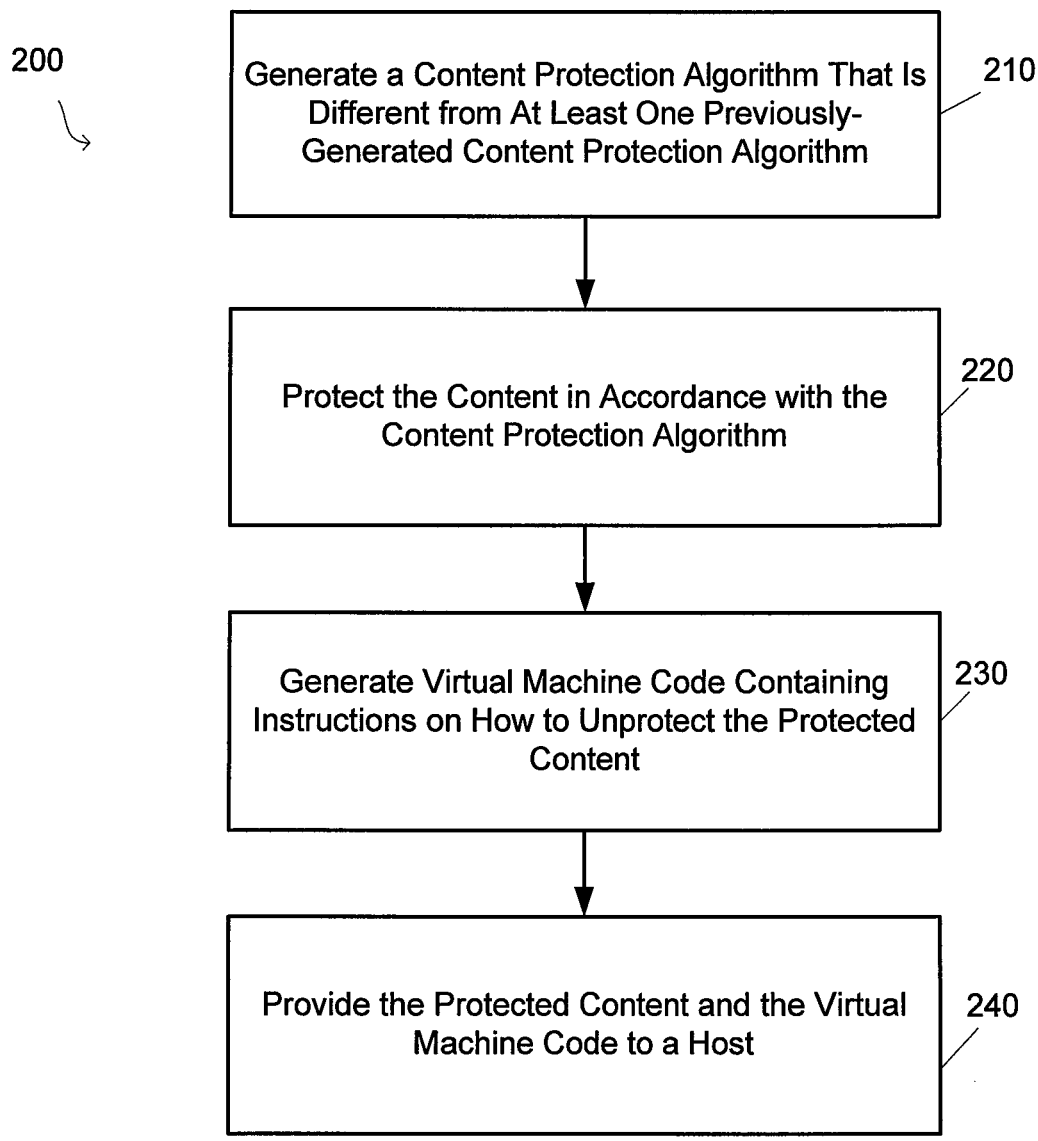
FIG. 2 is a flow chart of a method of an embodiment for adaptive protection of content.

FIG. 2 is a flow chart 200 of a method of an embodiment for adaptive protection of content using the memory device 100 of FIG. 1. As shown in the flow chart 200, when the controller 110 receives a request from the host 50 to play the content 130, the controller 110 generates a content protection algorithm that is different from at least one content protection algorithm previously generated by the controller (act 210). As used herein, a "content protection algorithm" (or a "security algorithm") refers to any algorithm that can be used to protect the content from unauthorized use. Any suitable content protection algorithm can be used, and examples of several different types of content protection algorithms are provided in the embodiments described below. The controller 110 can generate a content protection algorithm in any suitable manner. For example, the controller 110 can generate the content protection algorithm based on one or more of the following: host credentials used to authenticate the host 50 to the memory device 100, memory device credentials used to authenticate the memory device 100 to the host 50, host environment (e.g., processing power and memory capabilities of the host 50), memory device environment (e.g., processing power and memory capabilities of the memory device 100), type of content, and information about a virtual machine code previously-generated by the controller 110. Further, the controller 100 can generate the content protection algorithm "from scratch" or can generate the content protection algorithm by using a predetermined selection, a pseudo-random selection, or a random selection of content protection algorithms stored on the memory device 100. Additionally, a content provider or other party can provide the memory device 100 with instructions (e.g., in the form of virtual machine code) on how to generate the content protection algorithm. Regardless of how it is generated, the generated content protection algorithm is different from at least one content protection algorithm previously generated by the controller 110. In this way, the controller 110 provides adaptive/dynamic content protection, which is in contrast to the static protection described in the background section above.

Returning to FIG. 2, the controller 110 then protects the content 130 in accordance with the generated content protection algorithm (act 220) and generates virtual machine code containing instructions on how to unprotect the protected content (act 230). In this way, the virtual machine code matches the protection operation just performed on the content. The controller 110 then provides the protected content and the virtual machine code to the host 50 (act 240). After receiving the protected content and the virtual machine code, the virtual machine 70 in the host 50 would execute the virtual machine code and unprotect the protected content using the instructions contained in the virtual machine code. That is, the instructions in the virtual machine code instruct the virtual machine 70 how to "un-do" the content protection applied by the controller 110 in the memory device 100, so the host 50 can render the content for playback. In this way, the host 50 behaves like hosts that play content protected by a static protection architecture, since playback of that content also involves receiving and executing virtual machine code containing instructions on how to unprotect content. However, these embodiments provide an additional level of protection not provided by a static protection architecture, as discussed below.

Because the virtual machine code and protected content are static in the architecture described in the background section, over time, a hacker may be able to hack the content protection algorithm. Once the content protection algorithm is hacked, there would be no mechanism to prevent unauthorized use and copying of the content. In contrast, because the memory device 100 contains a controller 110, the memory device 100 can protect the content 130 with a content protection algorithm that is different from at least one content protection algorithm previously generated by the controller 110 and generate new virtual machine code at various times (e.g., upon each playback session of the content, after N number of playback sessions, within a single playback session, etc.) rather than merely store static content and static virtual machine code. This dynamic protection of the content means that even if a hacker hacks the content protection algorithm used in one instance of playback of the content, the content will still be protected because the memory device 100 will protect the content with a different content protection algorithm at the another instance of playback of the content. That is, instead of just needing to hacking a single, static content protection algorithm, a hacker would need to hack all possible combinations of content protection algorithms of a specific content title in order to get unlimited access to the content. This provides a significantly greater level of content protection than that provided by a static protection architecture.

As noted above, the content protection algorithm generated by the controller 110 is different from at least one content protection algorithm previously generated by the controller 110. This means that each generated content protection algorithm can be unique (if the generated content protection algorithm is different from all content protection algorithms previously generated by the controller 110) or a repeat of a previously-generated content protection algorithm (if the generated content protection algorithm is different from some but not all content protection algorithms previously generated by the controller 110). In the case of a repeat, it is preferred that the content protection algorithm be different from the last content protection algorithm that was generated. As discussed in more detail below, this can be achieved by analyzing stored virtual machine code associated with the content protection algorithm that was last generated.

As mentioned above, the memory device 100 of these embodiments can be implemented in any suitable manner. The following paragraphs and referenced drawings described one exemplary implementation. It should be understood that these embodiments are merely examples and that details shown and described herein should not be read into the claims unless explicitly recited therein.

Figure 3:
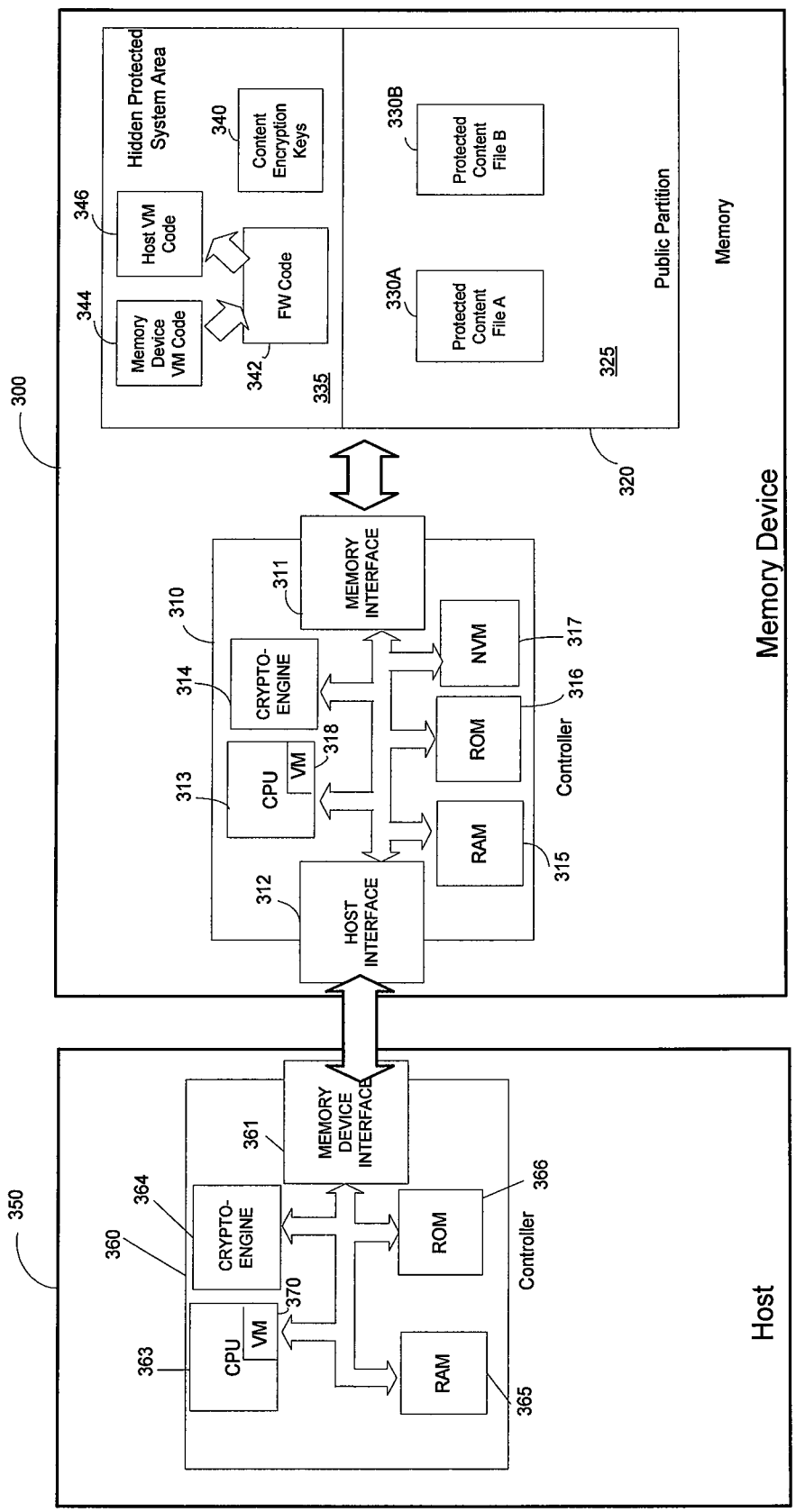
FIG. 3 is a block diagram of a host and a memory device of another embodiment.

Returning to the drawings, FIG. 3 is a block diagram of a memory device 300 and host 350 of another embodiment. As shown in FIG. 3, the memory device 300 comprises a controller 310 and a memory 320. The controller 310 comprises a memory interface 311 for interfacing with the memory 320 and a host interface 312 for interfacing with the host 350. The controller 310 also comprises a central processing unit (CPU) 313, a crypto-engine 314 operative to provide encryption and/or decryption operations, read access memory (RAM) 315, read only memory (ROM) 316 which stores firmware for the basic operations of the memory device 300, and a non-volatile memory (NVM) 317 which stores a device-specific key used for encryption/decryption operations. In this embodiment, CPU 313 can implement a virtual machine (VM) 318 by running firmware code 344 stored in the memory 320. However, in other embodiments, a separate subsystem in the controller 310 with its own CPU can implement the virtual machine. The use of the virtual machine 318 will be described below.

In this embodiment, the memory 320 comprises a public partition 325 that is managed by a file system on the host 350 and a hidden protected system area 335 that is internally managed by the controller 310. The hidden protected system area 335 stores content encryption keys (CEKs) 340, memory device virtual machine (VM) code, firmware (FW) code 342, and host virtual machine (VM) code 346. The public partition 325 and the hidden protected system area 335 can be part of the same memory unit or can be different memory units. The hidden protected system area 335 is "hidden" because it is internally managed by the controller 310 (and not by the host controller 360) and is "protected" because objects stored in that area 335 are encrypted with the unique key stored in the non-volatile memory 317 of the controller 310. Accordingly, to access objects stored in that area 335, the controller 310 would use the crypto-engine 314 and the key stored in the non-volatile memory 317 to decrypt the encrypted objects. Preferably, the memory device 300 takes the form of a TrustedFlash™ memory device by SanDisk Corporation.

The public partition 325 of the memory stores protected content files 330A, 330B. In this embodiment, the content files 330A, 330B, which can be different versions (e.g., resolution) of the same content title, are provided by a content provider and are released to a content replication and ingestion facility, which loads the content files 330A, 330B in the public partition 325. (Instead of the content 330A, 330B being preloaded in the memory device 320, the content files 330A, 330B can be side-loaded or downloaded into the memory device 320.) While the public partition 325 of the memory 320 is managed by a file system on the host 350, objects stored in the public partition 325 (such as the content files 330A, 330B) may also be protected by the memory device 100. In this embodiment, both stored content files 330A, 330B are protected by respective content encryption keys 340 stored in the hidden protected system area 335, and those keys 340 are themselves protected by the memory-device unique key stored in the non-volatile memory 317 of the controller 310. Accordingly, to unprotect one of the protected content files (say, content file 330A), the crypto-engine 314 would use the memory-device unique key stored in the non-volatile memory 317 of the controller 310 to decrypt the appropriate content encryption key 340 and then use the decrypted content encryption key 340 to decrypt the protected content 330A.

Turning now to the host 350, the host 350 comprises a controller 360 that has a memory device interface 361 for interfacing with the memory device 300. The controller 360 also comprises a central processing unit (CPU) 363, a crypto-engine 364 operative to provide encryption and/or decryption operations, read access memory (RAM) 365, and read only memory (ROM) 366. It should be noted that each component in box 360 can be implemented as separate chips in the overall host system. In this embodiment, the CPU 363 implements a virtual machine (VM) 370 by executing software stored in ROM 366. However, in other embodiments, the controller 360 can contain a separate virtual machine module with its own CPU.

The memory device 300 and the host 350 communicate with each other via a memory device interface 361 and a host interface 312. For operations that involve the secure transfer of data, it is preferred that the crypto-engines 314, 364 in the memory device 300 and host 350 be used to mutually authenticate each other and provide a key exchange. The mutual authentication process calls for the host 350 and memory device 300 to exchange unique certification IDs, which, as discussed below, could be used as part of the content protection algorithm generation process. After mutual authentication is complete, it is preferred that a session key be used to establish a secure channel for communication between the memory device 350 and host 300.

Figure 4A:
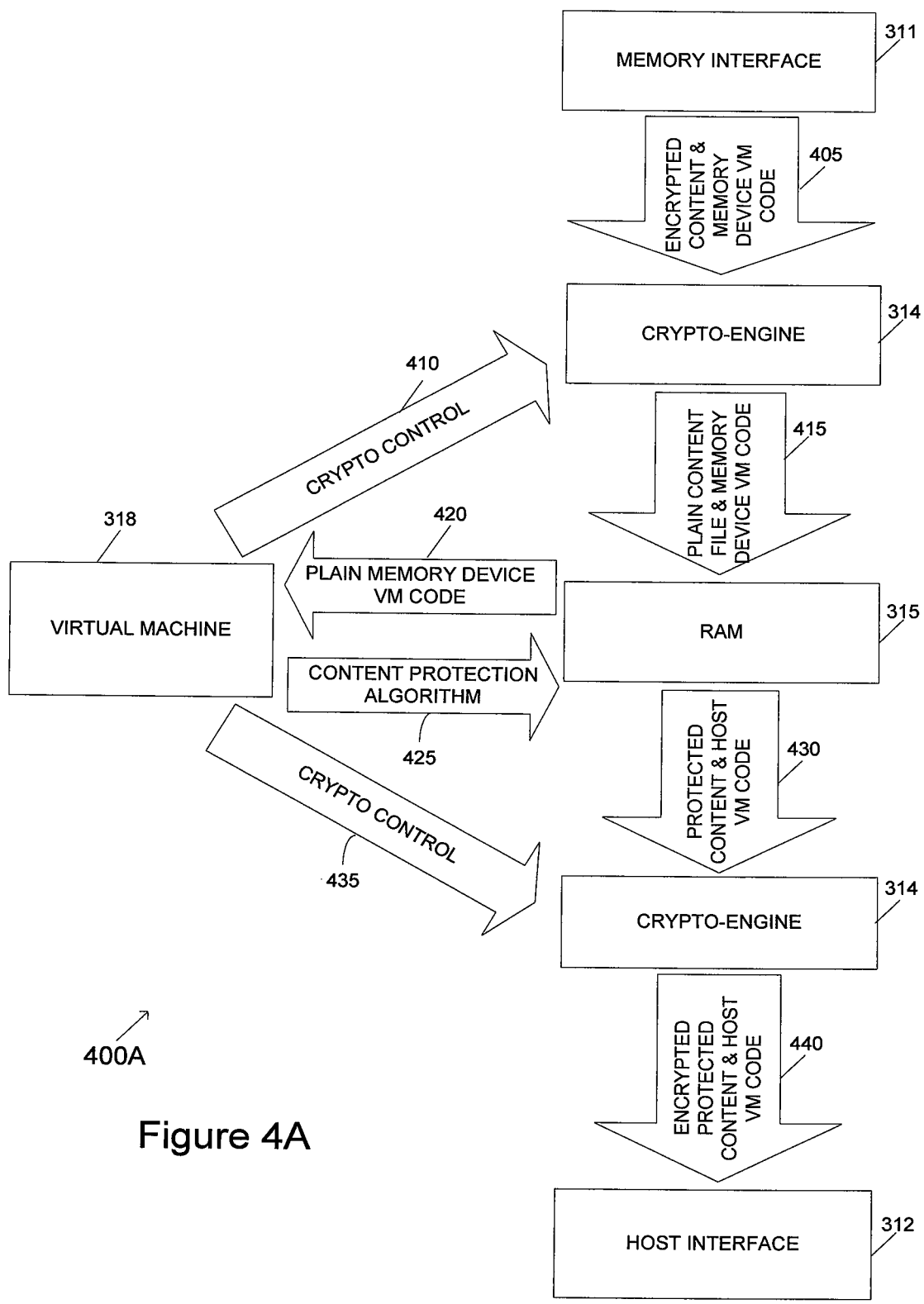
FIGS. 4A and 4B are flow charts of a method of an embodiment for adaptive protection of content for use with the memory device shown in FIG. 3.
Figure 4B:
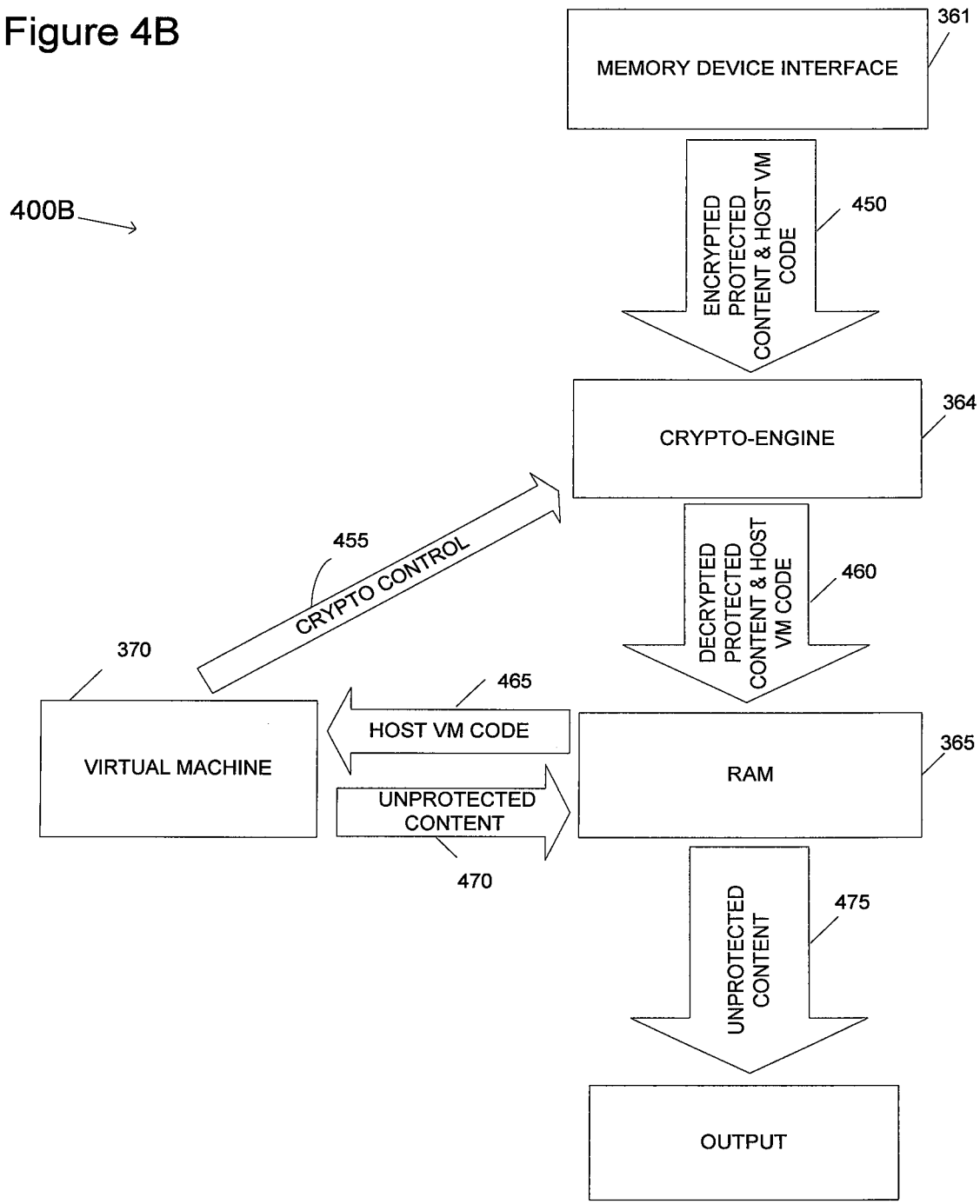

As mentioned above, the memory device 300 in this embodiment can be used to implement a method for adaptive protection of content. FIGS. 4A and 4B are flow charts 400A, 400B illustrating the acts of this method. FIG. 4A illustrates the acts performed by the memory device controller 300, and FIG. 4B illustrates the acts performed by the host controller 350. As shown in FIG. 4A, when the host 350 sends a command to the memory device 300 to read the content 330A, the memory device controller 310 reads the protected (encrypted) content 330A and the memory device virtual machine code 344 from the memory 320 (act 405). The virtual machine 318 sends crypto control commands to the crypto-engine 314 (act 410), in response to which the crypto-engine 314 uses the memory-device unique key in the non-volatile memory 317 to decrypt the memory device virtual machine code 344 and the content encryption key 340, which the crypto-engine 314 uses to decrypt the protected content 330A. The decrypted "plain" content file 330A and memory device virtual machine code 344 are then sent to the controller's RAM 315 (act 415).

The virtual machine 318 then reads the virtual machine code 344 from RAM 315 (act 430), which provides the virtual machine 318 with instructions on how to generate a content protection algorithm to protect the now-unprotected content 330A. For example, the virtual machine code 344 can specify that the content 330A be protected using one or more of the following methods: (1) AES encrypt data in segments with different predetermined keys, (2) SHA-1 encryption with the key obfuscated in the host virtual machine code 346, (3) XOR data bits with a fix value obfuscated in the host virtual machine code 346, (4) XOR every other byte in chunks with different values, (5) XOR data bits and then 3DES encrypt with a random key, (6) AES encrypt with a host unique certification ID, (7) AES encrypt with a memory device unique certification ID, (8) AES encrypt with NXOR of host and memory device certificate ID. In addition to or instead of using these methods, the firmware code 342 of the memory device 300 can specify additional algorithms or criteria to use for the selection or generation of the content protection algorithm. Such criteria include, but are not limited to, host credentials, memory device credentials, host environment, memory device environment, type of content, and information about a virtual machine code previously-generated by the controller 110 (e.g., the host virtual machine code 346), as well as instructions on whether the selection of the algorithm is predetermined, pseudo-random, or random.

Irrespective of the generation scheme used, the virtual machine 318 sends the generated content protection algorithm back to RAM 315 (act 425). The controller 310 then uses the generated content protection algorithm to protect the content 330A (e.g., by using the crypto-engine 314 to encrypt or corrupt the content 330A) and generates host virtual machine code 346, which contains instructions on how to unprotect the content protected by the generated content protection algorithm. (The order of the protecting and generating acts can be reversed, if desired.) The protected content 310A and the host virtual machine code 346 are stored in RAM 315 and are then read by the crypto-engine 314 in response to crypto control commands from the virtual machine 318 (acts 430 and 435). The crypto-engine 314 then encrypts the protected content 310A and the host virtual machine code 346 using the session key established when the memory device 300 and host 350 mutually authenticated. For example, the crypto-engine 314 can perform an AES128 encryption process and then an XOR operation on the actual data with the host and memory device unique IDs on the fly as the data is output to the host 350. The encrypted protected content 330A and the encrypted host virtual machine code 346 are then provided to the host interface 312 for transfer to the host 350 (act 440).

Returning to the drawings, FIG. 4B shows a flow chart 400B that illustrates the acts performed by the host controller 350. As shown in FIG. 4B, when the memory device interface 361 in the host 350 receives the encrypted protected content 330A and the encrypted host virtual machine code 346 from the memory device 300, the encrypted protected content 330A and the encrypted host virtual machine code 346 are provided to the host's crypto-engine 364 (act 450). In response to a crypto command sent to the crypto-engine 364 (act 455), the crypto-engine 364 decrypts the encrypted protected content 330A and the encrypted host virtual machine code 346 using the secure channel session unique key and then stores those decrypted items in the host's RAM 365 (act 460). The host's virtual machine 370 then reads the host virtual machine code 346 (act 465) and, using the instructions contained therein, unprotects the protected content 330A (e.g., by decrypting and/or uncorrupting it) and stores the unprotected content 330A in RAM 365 (act 470). The host controller 360 then reads the unprotected content 330A out of RAM 365 and sends it to an output device, such as a display device and/or speaker (act 475).

As noted above, the components shown in FIG. 3 can be implemented in any suitable manner. However, it is preferred that the components be able to perform the acts shown in the flow charts 400A, 400B shown in FIGS. 4A and 4B. For example, the memory device controller 310 preferably has sufficient CPU 313 processing power to execute the memory device virtual machine code 344 in order to generate and/or modify the host virtual machine code 346 in RAM 315 and manipulate the content 330A in accordance with the generated content protection algorithm as it is being output to the host 350. It is also preferred that the memory device controller 310 possess an architecture that allows efficient data flow to go through multiple iterations of crypto operations on the fly. Also, the memory device controller 310 preferably contains a large enough RAM 315 for the above operations. Further, it is preferred that the host controller 360 have the capability to execute the host virtual machine code 346 in a real time manner. Preferably, both the host 350 and memory device 300 operate under a secure execution environment where each of its components cannot be tampered with or scoped.

There are many alternatives that can be used with these embodiments. In one alternative, instead of just sending the host virtual machine code 346 to the host 350, the controller 310 can optionally store the host virtual machine code 346 in the memory 320, as represented by the arrows in FIG. 3. The stored host virtual machine code 346 can later be used as an input by the controller 310 when later generating a content protection algorithm. For example, the controller 310 can analyze the stored previously-generated host virtual machine code 346 to make sure to generate a different content protection algorithm, so that the same algorithm is not used twice in a row.

Another alternate embodiment relates to the creation of the first instance of host virtual machine code 346. As described above, the controller 310 in the memory device 300 generates the host virtual machine code 346 after (or before) the content was protected by the generated content protection algorithm. In some embodiments, the content 330A is initially stored in the memory device 300, and the host virtual machine code 346 does not exist until the memory device 300 creates the code after (or before) the content is protected by a memory-device-generated content protection algorithm. In another embodiment, the content provider protects the content with its own content protection algorithm before the content is stored in the memory device 300 and stores, in the memory device 300, both the protected content 330A and the host virtual machine code 346 needed to unprotect the protected content 330A, which is similar to static protection architectures. For example, the content provider can protect the content 330A using an AES128 key hidden in the host virtual machine code 346. Accordingly, in such embodiment, host virtual machine code 346 is stored in the memory device 300 before the memory device 300 is ever called upon to dynamically protect the content 330A. With this embodiment, the process described above for dynamically protecting the content would still be followed, but the dynamic protection provided by the memory device 300 would be on top of the static protection provided by the content provider. Accordingly, the memory device 300 would provide the host 350 with not only the virtual machine code it creates to undo the dynamic protection but also the virtual machine code provided by the content provider to undo the static protection. Alternatively, the memory device 300 can unprotect the statically-protected content using the virtual machine code provided by the content provider before applying its dynamic protection.

Yet another alternative relates to how often the content protection algorithm generated by the memory device 300 is varied. In one embodiment, the memory device 300 applies a single content protection algorithm to all of the bits of data of the content 330A in real-time as the data is being sent to the host 350. In this embodiment, the memory device 300 dynamically modifies the content protection algorithm for each playback event. In an alternate embodiment, the memory device 300 dynamically modifies the content protection algorithm within a playback event. For example, after a certain playback duration (e.g., 10 minutes, 100 MB, or a video chapter), the memory device 300 can initiate a challenge-response session with the host 350.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the preferred embodiments described herein can be used alone or in combination with one another.

What is claimed is:

1. A memory device for transporting content to a host for playback, the memory device comprising:

a memory operative to store content and first virtual machine code; and a controller in communication with the memory, wherein the controller is operative to:
- (a) implement a virtual machine operative to execute the first virtual machine code to generate a content protection algorithm that is different from at least one content protection algorithm previously generated by the controller;
- (b) protect the content in accordance with the content protection algorithm;
- (c) generate second virtual machine code containing instructions on how to unprotect the protected content; and
- (d) provide the protected content and the second virtual machine code to a host in communication with the memory device, wherein the memory device is removably connectable to the host;

wherein the controller is further operative to perform mutual authentication with the host before providing the protected content and the second virtual machine code to the host;

wherein the controller is further operative to encrypt the protected content and the second virtual machine code prior to providing those items to the host; and wherein the controller is further operative to perform (a)-(d) upon each playback session of the content using a different content protection algorithm.

2. The memory device of claim 1, wherein the controller is further operative to perform (a)-(d) multiple times within a single playback session of the content using different content protection algorithms.

3. The memory device of claim 1, wherein the controller is operative to perform (a)-(d) in real-time during playback of the content.

4. The memory device of claim 1, wherein the controller is further operative to store the second virtual machine code in the memory.

5. The memory device of claim 1, wherein the content stored in the memory device is protected in accordance with a second content protection algorithm, wherein the memory is further operative to store third virtual machine code containing instructions on how to unprotect the content protected in accordance with the second content protection algorithm, and wherein the controller is further operative to provide the third virtual machine code to the host.

6. The memory device of claim 1, wherein the controller is operative to generate the content protection algorithm based on one or more of the following: host credentials, memory device credentials, host environment, memory device environment, type of content, information about a previously-generated virtual machine code, a predetermined selection of content protection algorithms, a pseudo-random selection of content protection algorithms, and a random selection of content protection algorithms.

7. A method for adaptive protection of content stored in a memory device that transports content to a host for playback, the method comprising:

performing in a controller of a memory device, the memory device comprising a memory operative to store content and first virtual machine code:
- (a) implementing a virtual machine operative to execute the first virtual machine code to generate a content protection algorithm that is different from at least one content protection algorithm previously generated by the controller;
- (b) protecting the content in accordance with the content protection algorithm;
- (c) generating second virtual machine code containing instructions on how to unprotect the protected content;
- (d) providing the protected content and the second virtual machine code to a host in communication with the memory device, wherein the memory device is removably connectable to the host;
- (e) performing mutual authentication with the host before providing the protected content and the second virtual machine code to the host;
- (f) encrypting the protected content and the second virtual machine code prior to providing those items to the host; and
- (g) performing (a)-(e) upon each playback session of the content using a different content protection algorithm.

8. The method of claim 7, wherein (a)-(d) are performed multiple times within a single playback session of the content using different content protection algorithms.

9. The method of claim 7, wherein (a)-(d) are performed in real-time during playback of the content.

10. The method of claim 7 further comprising storing the second virtual machine code in the memory.

11. The method of claim 7, wherein the content stored in the memory device is protected in accordance with a second content protection algorithm, wherein the memory is further operative to store third virtual machine code containing instructions on how to unprotect the content protected in accordance with the second content protection algorithm, and wherein the method further comprises providing the third virtual machine code to the host.

12. The method of claim 7, wherein the content protection algorithm is generated based on one or more of the following: host credentials, memory device credentials, host environment, memory device environment, type of content, information about a previously-generated virtual machine code, a predetermined selection of content protection algorithms, a pseudo-random selection of content protection algorithms, and a random selection of content protection algorithms.

* * * * *